United States Patent [19]
Katoku et al.

[11] Patent Number: 4,858,848
[45] Date of Patent: Aug. 22, 1989

[54] MAGNETIC TAPE CASSETTE

[75] Inventors: Takashi Katoku; Masato Tanaka, both of Tokyo, Japan

[73] Assignee: Sony Corporation, Tokyo, Japan

[21] Appl. No.: 202,484

[22] Filed: Jun. 6, 1988

[30] Foreign Application Priority Data

Jun. 18, 1987 [JP] Japan .................... 62-94030[U]

[51] Int. Cl.$^4$ ............... G11B 23/04; G11B 23/113
[52] U.S. Cl. .................................. 242/198; 242/199
[58] Field of Search ............... 242/198, 199; 360/132, 360/96.5, 133, 60

[56] References Cited

U.S. PATENT DOCUMENTS

| 3,519,521 | 5/1985 | Yoshi | 242/198 x |
| 4,452,407 | 6/1984 | Ogata et al. | 242/198 |
| 4,473,202 | 9/1984 | Verhoeven | 242/198 |
| 4,536,812 | 8/1985 | Oishi et al. | 360/60 X |
| 4,556,153 | 12/1985 | Takagi et al. | 242/199 X |
| 4,572,461 | 2/1986 | Horikawa et al. | 242/198 |
| 4,589,609 | 5/1986 | Oishi et al. | 242/198 X |
| 4,643,304 | 2/1987 | Sumida et al. | 242/197 X |

Primary Examiner—David Werner
Assistant Examiner—Phillip Han
Attorney, Agent, or Firm—Lewis H. Eslinger; Jay H. Maioli

[57] ABSTRACT

A magnetic tape cassette of very small type having a front lid pivotably secured to the cassette housing so as to open or close a front opening portion, and a guide portion arranged on the front wall of the lid at an asymmetrical position so as to extend in the longitudinal direction. Thus, when a number of tape cassettes are accommodated within a cassette magazine, the guide portions function as a guide so that all the tape cassettes with tracks A and B aligned in the same direction can be accommodated within the cassette magazine. Also, the tape cassette of the invention can be positively loaded on a recording and/or reproducing apparatus from a desired surface side. Further, since the guide portion is formed on the lid, mechanical strength of the cassette housing can be prevented from being decreased and the indication label attaching area on the top wall of the cassette housing is prevented from being restricted.

9 Claims, 6 Drawing Sheets

MAGNETIC TAPE CASSETTE

BACKGROUND OF THE INVENTION

1. Field of the Invention

The present invention relates generally to a magnetic tape cassette in which a front lid is pivotably mounted on the cassette housing so as to selectively open or close a front opening portion for a tape path of the cassette housing in order to protect a magnetic tape from being damaged. More particularly, this invention relates to a magnetic tape cassette of the sort as described above which is suitable for accommodating therein a magnetic tape on and/or from which a PCM (pulse-code-modulated) signal is recorded and/or reproduced.

2. Description of the Prior Art

FIGS. 1 and 2 are illustrations, respectively, of a conventional magnetic tape cassette in which a magnetic tape for a PCM signal is accommodated.

As FIG. 1 shows, a cassette housing 1 is comprised of an upper section or half 1a and a lower section or half 1b, which are secured together by suitable conventional means such as screws. A pair of reel hubs 2a and 2b are mounted rotatably in the cassette housing 1, and a magnetic tape 3 is wound on the pair of reel hubs 2a and 2b. A front lid 4 is pivotably mounted on the cassette housing 1 so as to selectively open or close the front opening portion of the cassette housing 1.

Now, FIG. 1 shows the state in which the front opening portion of the cassette housing 1 is closed by the front lid 4. The front lid 4 comprises a lid main section 4a and a pair of side supporting sections 4b. The lid main section 4a has a rectangular configuration having a length and width sufficient so that it can close the entire front opening portion of the tape cassette. The pair of side supporting sections 4b are elongated from both side ends of the lid main section 4a and bent backwards at a right angle. The side supporting sections 4b respectively each have a shaft aperture which is rotatably supported by a shaft 6 formed at a predetermined position on each side wall of the cassette housing. The front lid 4 is made of a plastic material having sufficient flexibility or elasticity so that when it is warped toward the cassette housing 1 side, it can be engaged with the front opening portion of the cassette housing 1 due to its elastic deformation, thus being halted at a predetermined position to close the front opening portion of the cassette housing 1.

FIG. 2 illustrates the conventional magnetic tape cassette of this example which is ready for recording or reproduction. As FIG. 2 shows under this condition, the front lid 4 is opened manually or automatically by automatic lid opening and/or closing mechanisms (not shown) of a tape recorder or the like and the magnetic tape 3 is exposed in the front opening portion of the cassette housing 1.

As described above, the magnetic tape cassette of this example is provided with the front lid 4 so that without a specially-prepared cassette case, upon non-use, as illustrated in Fig. 1, the front opening portion of the cassette housing 1 is closed by the front lid 4 so as to protect the magnetic tape 3 in the front opening portion from being touched by fingers or the like. Also, by the front lid 4, dust, smudges and the like can be prevented from entering the main body of the magnetic tape cassette.

In the thus arranged magnetic tape cassette, the front lid 4 can be rotated symmetrically in an up and down direction relative to the front opening portion of the cassette housing 1, thus making it possible to independently effect the recording and/or reproduction on both tracks A and B of the magnetic tape 3. When accommodating a plurality of such tape cassettes into a cassette magazine in such a fashion that the tracks A and B of each tape cassette are aligned side by side, they have to be put into the cassette magazine with their tracks A and B aligned while looking at the indications of label areas on the tape cassettes.

Meanwhile, a so-called micro-tape cassette is known and it is the smallest tape cassette now available on the market. If such a micro-tape cassette is further miniaturized, for example, to be substantially 25×20×5 mm in size, the track indication on the label area becomes difficult to see. Hence, such very small magnetic tape cassettes are difficult to be accommodated within a cassette magazine so as to align their tracks A and B side by side.

When the magnetic tape 3 provided within the cassette housing 1 is transported at a constant speed, with the lid 4 opened, a capstan rotatably contacts with a guide roller (not shown) provided within the cassette housing 1 and at the side wall portion adjacent to the front opening or tape path portion of the tape cassette for transport therebetween. Under this condition, since the front lid 4 is located at the surface side of the cassette housing 1, or above the front opening portion of the cassette housing 1, the front lid 4 opposes or contacts the bearing of the capstan or a capstan arm, though not shown. To solve this problem, the capstan has to be formed long in length. If the length of the capstan is increased, the capstan occupies a larger space in its location and this causes the apparatus such as a tape recorder to inevitably become large in size.

OBJECTS AND SUMMARY OF THE INVENTION

Accordingly, it is an object of this invention to provide an improved magnetic tape cassette of very small size.

It is another object of this invention to provide a very small magnetic tape cassette which can be accommodated within a cassette magazine so as to align its tracks A and B in the same direction.

It is a further object of this invention to provide a very small magnetic tape cassette in which a front lid is arranged to have an escape space for the bearing of a capstan or a capstan arm so that a magnetic tape can be transported by a short capstan.

According to one aspect of the present invention, there is provided a magnetic tape cassette comprising: (a) a cassette housing having a front opening portion; (b) a front lid formed of a lid main section and supporting arm portions attached perpendicularly to said lid main section at both its end portions, said front lid being pivotably mounted on the front portion of said cassette housing at said supporting arm portions so as to selectively open and/or close said front opening portion of said cassette housing; and (c) a guide member formed on the front surface portion of said lid main section at an asymmetrical position relative to the up and down direction of said front lid so as to be extended in its longitudinal direction.

According to another aspect of the present invention, there is provided a magnetic tape cassette comprising: (a) a cassette housing having a front opening portion;

(b) a front lid formed of a lid main section and supporting arm portions attached perpendicularly to said lid main section at both its end portions, said front lid being pivotably mounted on the front portion of said cassette housing at said supporting arm portions so as to selectively open and/or close said front opening portion of said cassette housing; (c) tape guide rollers respectively provided in said cassette housing at both side end positions of the front opening portion of said cassette housing; and d) grooves respectively formed on both side end portions of said lid main section at positions opposing said guide rollers in a direction perpendicular to the longitudinal direction.

The above and other objects, features and advantages of the present invention will become apparent from the following detailed description of the preferred embodiment to be taken in conjunction with the accompanying drawings, throughout which like reference numerals identify like elements and parts.

DETAILED DESCRIPTION OF THE PREFERRED EMBODIMENT

An embodiment of a magnetic tape cassette according to the present invention will no be described in detail with reference to FIGS. 3 to 9. As earlier noted, the magnetic tape cassette to which the invention is applied is very small in size, and by way of example, it is substantially 25×20×5 mm.

Figure 1:
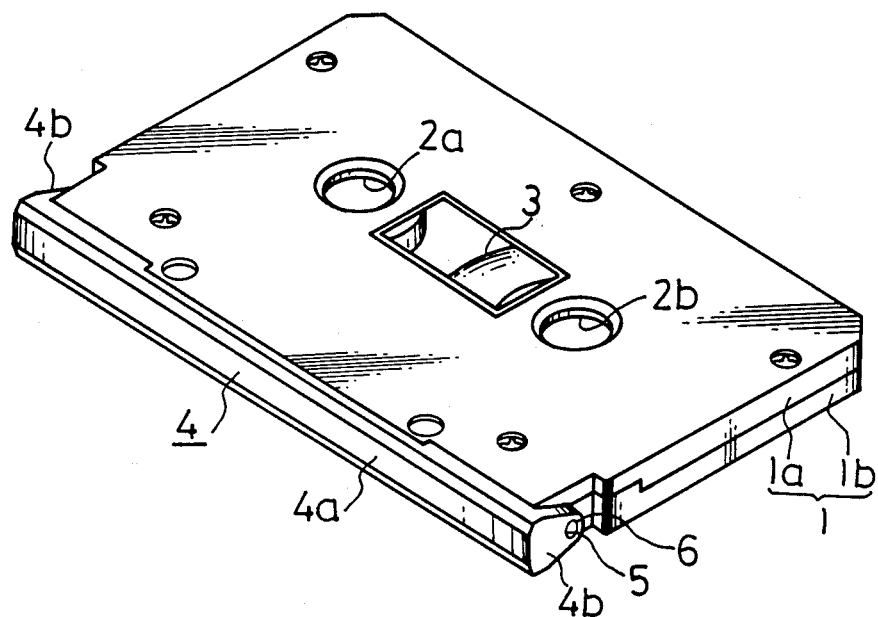
FIG. 1 is a perspective view of an example of a conventional magnetic tape cassette with its front lid closed.
Figure 2:
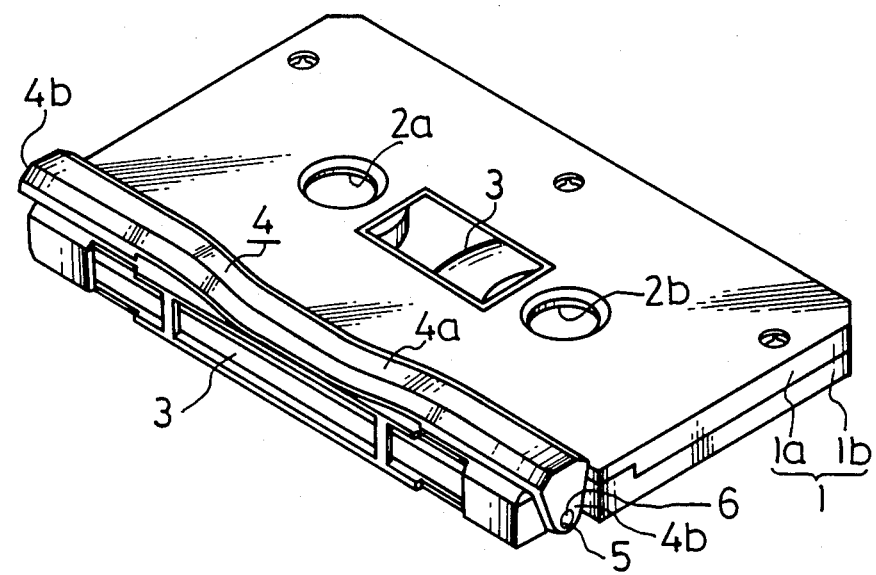
FIG. 2 is a perspective view of the same conventional magnetic tape cassette with its front lid opened.
Figure 3:
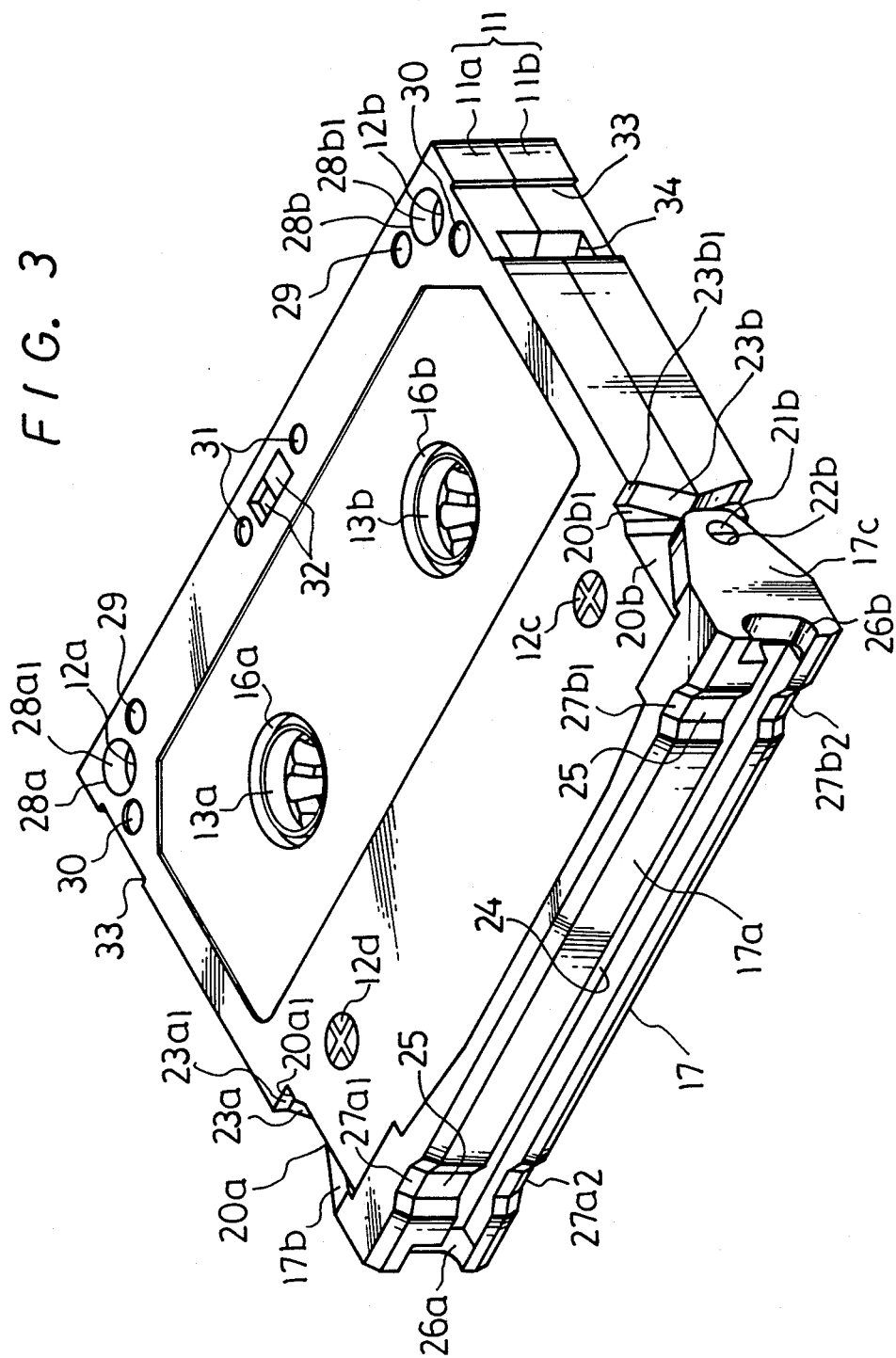
FIG. 3 is a perspective view of an embodiment of a magnetic tape cassette according to the present invention.
Figure 4:
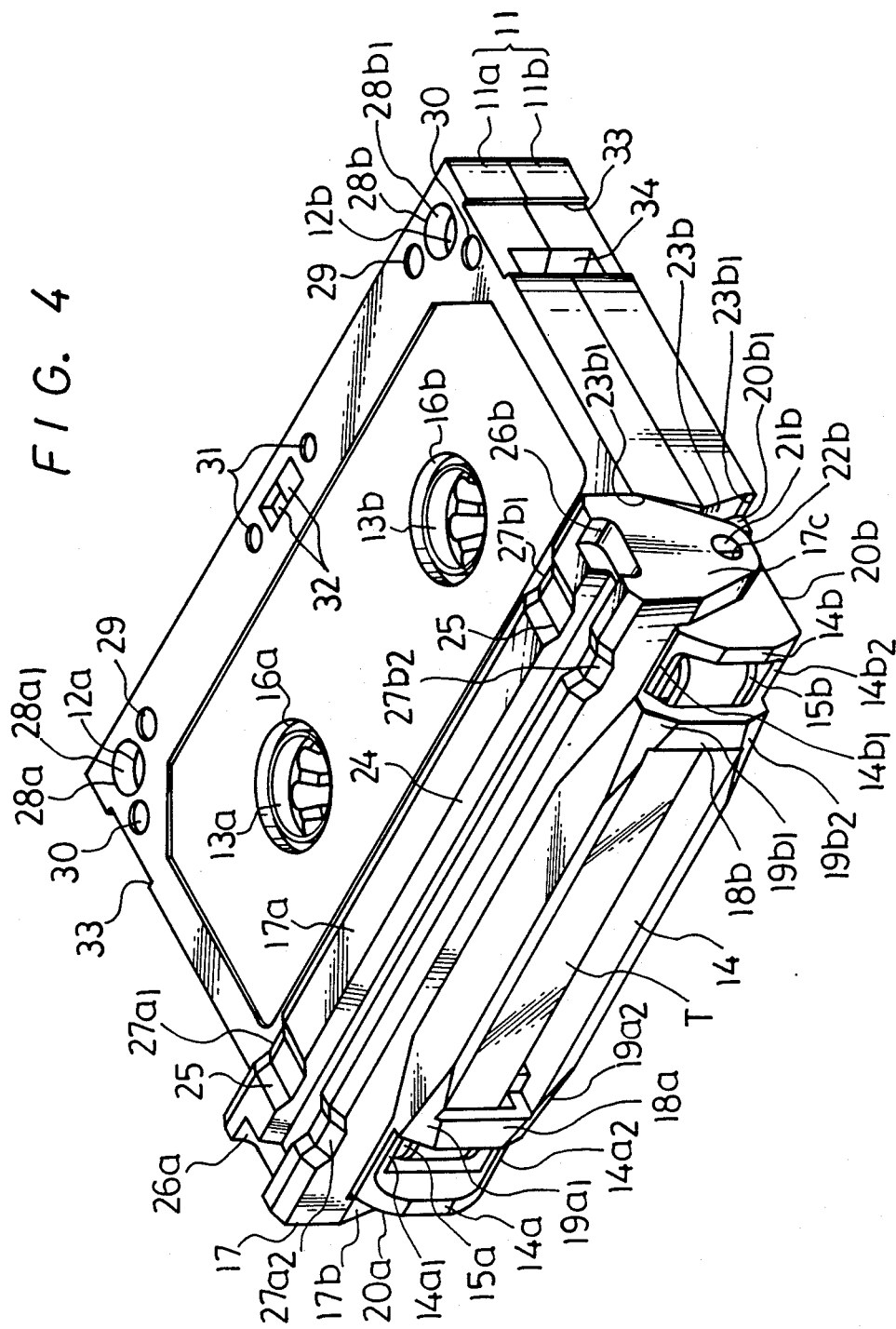
FIG. 4 is a similar perspective view of the embodiment of the magnetic tape cassette shown in FIG. 3 illustrating the state in which its rotatable front lid is opened.

As FIGS. 3 and 4 show, there is provided a cassette housing 11 in which a magnetic tape T is accommodated. Similarly as described above, a PCM signal, for example, is recorded on the magnetic tape T. The cassette housing 11 comprises an upper section or half 11a and a lower section or half 11b which are secured together by a suitable coupling means such as four screws 12a, 12b, 12c and 12d (see FIG. 5). Within the cassette housing 11, the magnetic tape T is wound on a pair of tape reels 13a and 13b.

As FIG. 4 shows, at the front side of the cassette housing 11, there is formed a front opening portion 14 which occupies substantially the whole surface of the front surface portion of the cassette housing 11. A pair of guide rollers 15a and 15b are rotatably provided within the cassette housing 11 at both side end portions of this front opening portion 14. Thus, a tape path for the magnetic tape T is formed between the guide rollers 15a and 15b in the front opening portion 14 along which the magnetic tape T is transported. The magnetic tape T passes around the guide rollers 15a and 15b and then is wound onto the tape reels 13a and 13b. Through the upper and lower walls or on the upper half 11a and the lower half 11b of the cassette housing 11, there are symmetrically formed reel shaft receiving apertures 16a and 16b which are arranged at the tape reels 13a and 13b, respectively.

At the front surface side of the cassette housing 11, a front lid 17 is pivotably mounted so as to selectively open or close the front opening portion 14 of the cassette housing 11. Similarly as described hereinabove, the front lid 17 is made of a plastic material having sufficient flexibility and comprises a lid main section 17a opposing the front opening portion 14 of the cassette housing 11 and support arm portions 17b and 17c which are respectively elongated at a right angle from both side ends of the lid main section 17a toward the rear of the cassette housing. The lid main section 17a is biased backwards, or toward the inside of the cassette housing 11.

In the thus constructed magnetic tape cassette, as shown in FIG. 4, step portions 14a and 14b are respectively formed on both side end portions of the front opening portion 14 which forms a part of the tape path portion of the cassette housing 11. The step portions 14a and 14b are respectively retreated backward as compared with the central portion of the front opening portion 14. On the upper and lower edges of both the step portions 14a and 14b, there are formed cut-away concave portions 14a1, 14b1, 14a2 and 14b2 in such a manner that a part of each of the guide rollers 15a and 15b can be viewed from the upper and lower sides. Guide members 18a and 18b are respectively secured to the front opening 14 at positions inside the step portions 14a and 15b so as to bridge the upper and lower edges of the front opening portion 14. The upper and lower edges of the front opening portion 14 are tapered to provide tapered surfaces 19a1, 19b1, 19a2 and 19b2 which are extended and inclined gradually to the rear side from the inside of the guide members 18a and 18b to the step portions 14a and 14b, respectively.

On the front end portions of both side walls of the cassette housing 11, stepped surface portions 20a and 20b are formed so as to oppose the arm portions 17b and 17c of the front lid 17 over the upper half 11a and the lower half 11b. The depth of each of the stepped surface portions 20a and 20b is substantially equal to the thickness of each of the arm portions 17b and 17c. As shown in, for example, FIG. 5, shafts or pins 21a and 21b are respectively implanted on the stepped surface portions 20a and 20b, while shaft apertures 22a and 22b are respectively formed through the arm portions 17b and 17c of the front lid 17. Then, the apertures 22a and 22b of the arm portions 17b and 17c of the front lid 17 are rotatably engaged with the pins 21a and 21b respectively so that the front lid 17 is rotatable upwardly or downwardly with respect to the cassette housing 11 so as to selectively open or close the front opening portion 14 of the cassette housing 11.

In the condition where the front lid 17 closes the front opening portion 14, the lid main section 17a is elastically deformed due to its elasticity and is brought in contact with the upper and lower edges of the front opening portion 14, i.e., the front end edges of the upper half 11a and the lower half 11b thereby supported by itself. Also, under the condition that the front lid 17 closes the front opening portion 14, as the lid main section 17a is elastically deformed, the arm portions 17b and 17c of the front lid 17 are inwardly biased and brought in contact with the stepped surface portions 20a and 20b of the cassette housing respectively, thus the outer surfaces of both the arm portions 17b and 17c are substantially flush with the outer surfaces of both side walls of the cassette housing 11, as shown in FIG. 5.

In the state where the lid main section 17a is brought in contact with the upper or lower edge of the front opening portion 14 of the cassette housing 11 while the lid 17 is being rotated to open the front opening portion 14, the lid main section 17a is elastically deformed with the largest deformation amount and is thereby placed in the engaged state, or placed at the dead point position. When the lid main section 17a passes this dead point position, it is recovered from the deformed state and the front lid 17 is rotated upwardly or downwardly to open the front opening portion 14 of the cassette housing 11, which is a so-called click operation. Under this condition, the arm portions 17b and 17c are free from the biasing force of the lid main section 17a and they are released from contacting with the stepped surface portions 20a and 20b of the cassette housing 11. Then, clearances could be respectively produced between the arm portions 17b, 17c and the stepped surface portions 20a, 20b and the front lid 17 could slide in the lateral direction.

Figure 5:
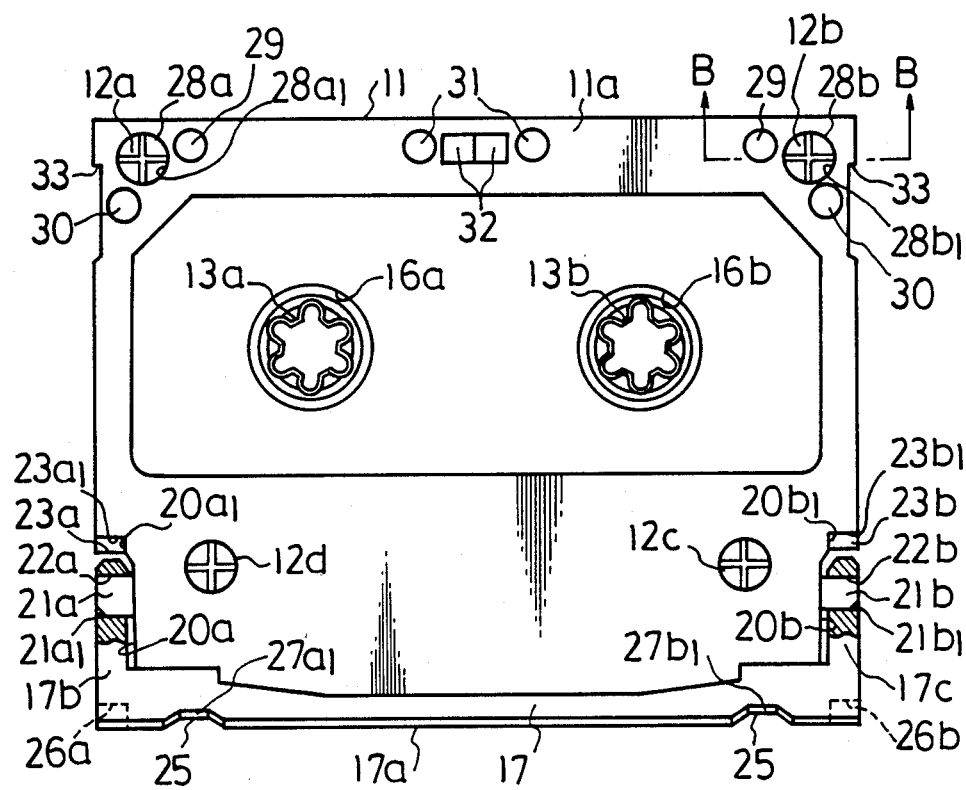
FIG. 5 is a plan view of the magnetic tape cassette shown in FIG. 3 with its parts being shown in cross-section.
Figure 6:
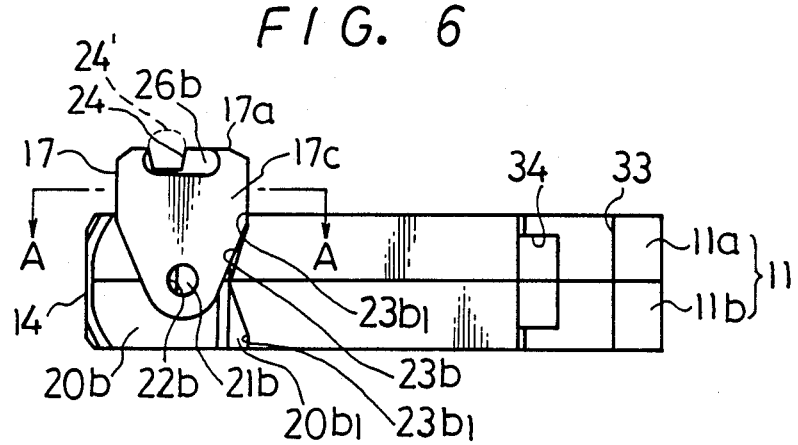
FIG. 6 is a side view of the magnetic tape cassette of the invention illustrating the state in which its front lid is opened.
Figure 7:
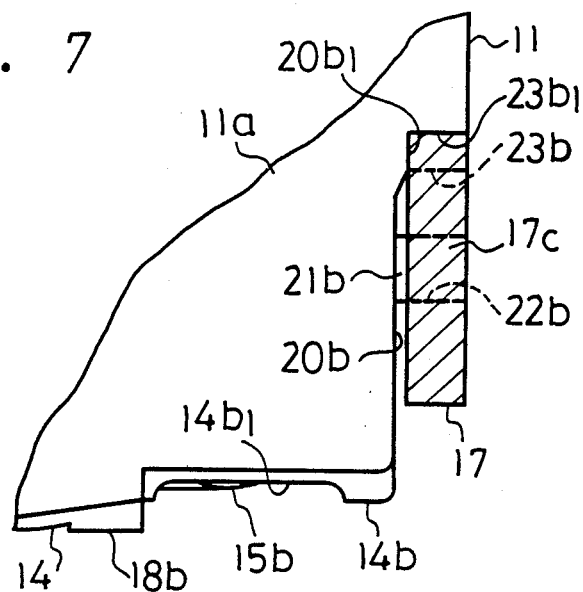
FIG. 7 is an enlarged cross-sectional view taken through the line A—A of FIG. 6 looking in the direction shown by the arrows.

To solve this problem, in this embodiment, as shown, for example, in FIG. 5, outwardly-protruded edge surfaces 20a1 and 20b1 are respectively formed on the stepped surface portions 20a and 20b of the cassette housing 11 at positions so as to come in contact with the inner surfaces of the arm portions 17b and 17c when the front lid 17 is opened (refer to FIG. 7). These protruded edge surfaces 20a1 and 20b1 can prevent the front lid 17 from sliding in the lateral direction when the front lid 17 is in its opened state. The protruded edge surfaces 20a1 and 20b1 are respectively formed at such positions that they are spaced apart from the arm portions 17b and 17c when the front lid 17 is in its closed state and the lid 17 is in the midst of being opened or closed. Consequently, as the lid main section 17a is elastically deformed, the arm portions 17b and 17c can be satisfactorily deformed with elasticity to enable the front lid 17 to be opened or closed positively.

As shown in FIG. 3, the rear half portion of each of the arm portions 17b and 17c of the front lid 17 is formed to have a substantially fan-like configuration which is spread in the forward direction from each of the peripheries of the shaft apertures 22a and 22b. Meanwhile, stopper edge surfaces 23a and 23b, which are respectively engaged with the arm portions 17b and 17c when the arm portions 17b and 17c are in their opened positions, are respectively formed on the stepped surface portions 20a and 20b of the cassette housing 11. These stopper edge surfaces 23a and 23b are each so shaped that they are along the inclined sides of the rear half portions of the arm portions 17b and 17c, or inclined rearward from the centers symmetrical with respect to the up and down direction (see, for example, FIGS. 3 and 6). The upper and lower end portions of the edge surfaces 23a and 23b are formed as vertical surfaces 23a1 and 23b1, respectively, as illustrated in FIG. 3. Accordingly, the central portions of these stopper edge surfaces 23a and 23b are located in the vicinity of the end edges of the supporting portions of the arm portions 17b and 17c as shown in FIG. 3 or 5 when the front lid 17 is in its closed state.

As shown in FIG. 5, shafts or pins 21a and 21b respectively implanted on the stepped surface portions 20a and 20b of the cassette housing 11 to rotatably support both the arm portions 17b and 17c of the front lid 17 respectively have different diameters and tapered surfaces 21a1 and 21b1 each being inclined forward at the end portions thereof. The shaft receiving apertures 22a and 22b formed through the arm portions 17b and 17c of the front lid 17 to receive the pins 21a and 21b respectively have different inner diameters so that the lid 17 can be prevented from being pivotably mounted to the cassette housing 11 in a reverse or wrong condition.

Figure 10:
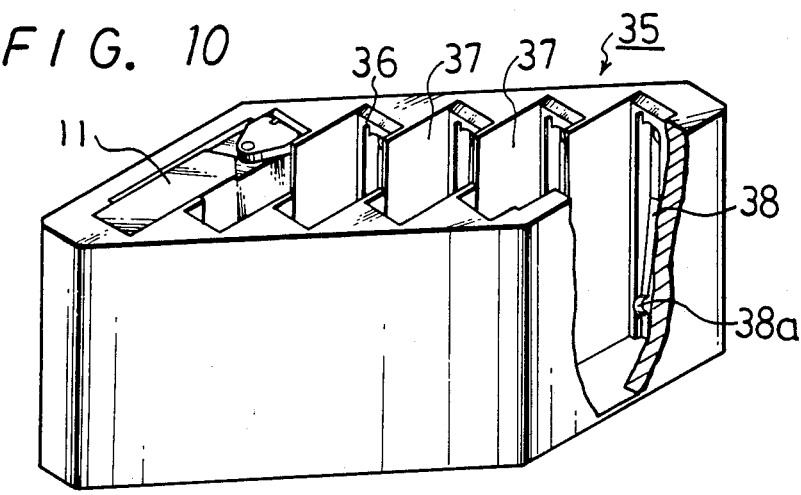
FIG. 10 is a perspective view of a cassette magazine in which a plurality of magnetic tape cassettes of the invention can be accommodated.

As FIGS. 3 and 4 show, on the front surface of the lid main section 17a of the front lid 17, there is formed a guide groove 24 in the longitudinal direction of the lid main section 17a and at a location asymmetrical with respect to the up and down direction. As FIG. 10 shows, when a plurality of magnetic tape cassettes of the invention are respectively accommodated into a plurality of compartments 37 partitioned in a single cassette magazine 35, the guide grooves 24 are respectively engaged with engaging portions 36 provided in the compartments 37 of the cassette magazine 35, thus making it possible to insert and keep the respective magnetic tape cassettes in the cassette magazine 35 in such a manner that the tracks A and B of the respective magnetic tape cassettes are aligned in the same direction. Since the guide groove 24 is formed on the front lid 17, the mechanical strength of the cassette housing 11 is not weakened at all. Particularly in the very small magnetic tape cassette, various detecting portions such as a tape end sensor or the like and a label area for indication provided on the surface of the cassette housing are also not restricted.

As shown in FIG. 3, on the surface of the lid main section 17a of the front lid 17 at its both sides, there are formed engaging groove portions 25 in the up and down direction of the lid main section 17a. When the tape cassette is inserted into the compartment 37 of the cassette magazine 35 as mentioned hereinabove, one of the groove portions 25 is engaged with a projection 38a of a latch mechanism 38 provided within each compartment 37 of the cassette magazine so as to maintain the accommodated state of the tape cassette within the compartment 37 of the cassette magazine 35. Since the latch engagement groove portions 25 are each formed on the front lid 17, the mechanical strength of the cassette housing 11 is not weakened at all. Particularly, in the case of a very small magnetic tape cassette, various detecting sections and the label area for indication or the like provided on the surface of the cassette housing 11 are also not restricted.

Figure 9:
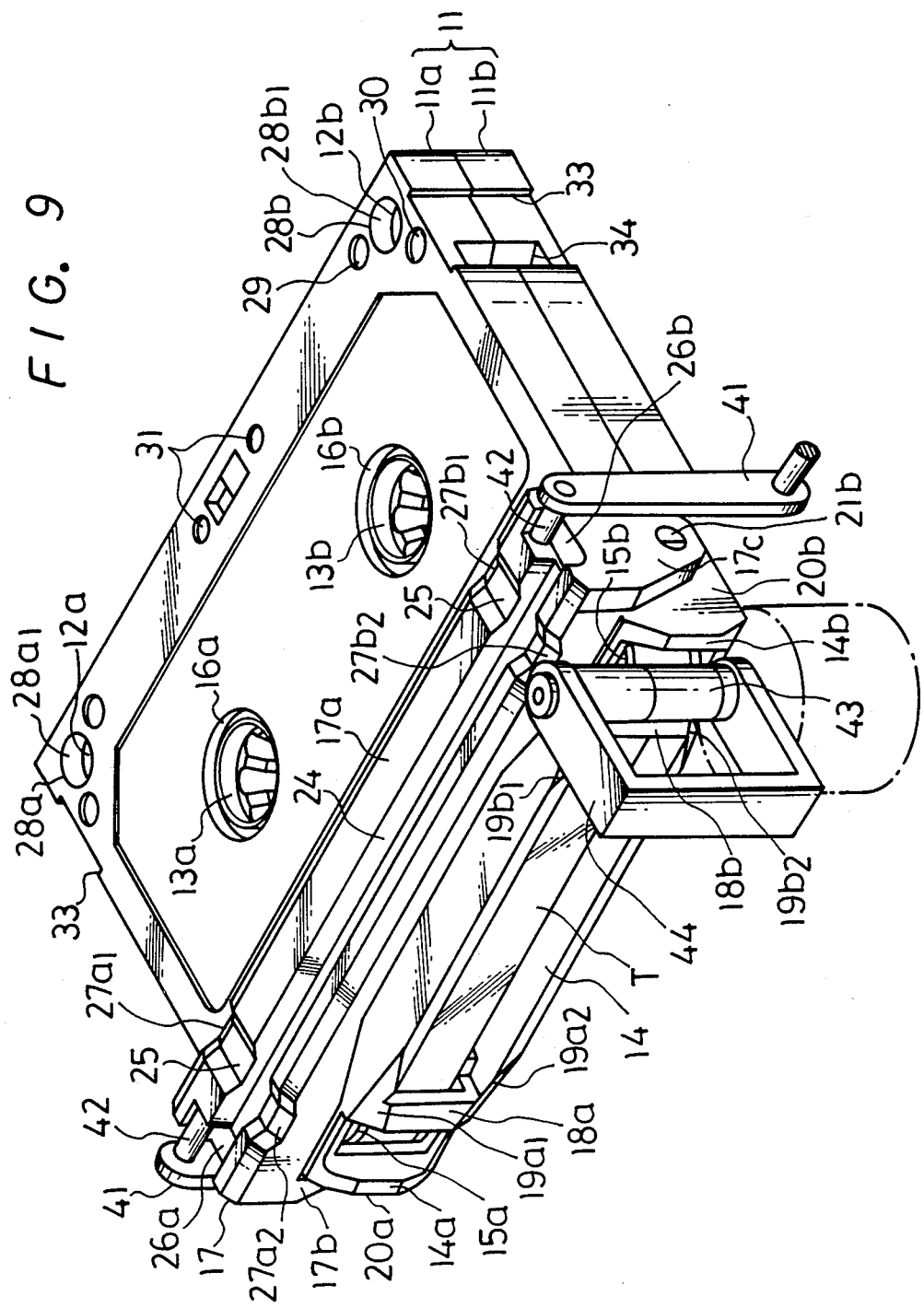
FIG. 9 is a perspective view of the magnetic tape cassette of the invention upon use.

FIG. 9 is a perspective view of the magnetic tape cassette of the present invention upon use. As FIG. 9 shows, on both side surfaces of the front lid 17, i.e., on both end surfaces of the lid main section 17a, there are respectively formed engaging concave portions 26a and 26b. These concave portions 26a and 26b are respectively engaged with engaging pins 42 of lid opening and/or closing mechanisms 41 provided at a tape cassette loading section of a reproducing apparatus (not shown). When the tape cassette with its front lid 17 closed is loaded onto the tape cassette loading section, the engaging pins 42 are engaged with the concave portions 26a and 26b respectively. In this state, the lid opening and/or closing mechanisms 41 are rotated to allow the engaging pins 42 to rotate the front lid 17 in the opening direction, thus opening the front opening portion 14 of the cassette housing 11.

Under the condition wherein the front lid 17 is rotated and the front opening portion 14 of the cassette housing 11 is opened, a capstan 43 is urged against the roller 15a or 15b through the upper or lower edge cutaway concave portions 14a1, 14a2 or 14b1, 14b2 of the front opening portion 14 (refer to FIG. 4). In this case, in order to prevent the tip end of a capstan arm 44 from abutting against the front lid 17, in this embodiment, cutaway concave portions 27a1, 27a2 and 27a1, 27b2 are formed on the corner portions of the upper and lower end edge portions of the lid main section 17a of the front lid 17 in correspondence with the rollers 15a and 15b, respectively, whereby the front lid 17 can be spaced apart from the tip end of the capstan arm 44. Thus, the capstan 43 can positively come in contact with the roller 15a or 15b so that the magnetic tape T can be stably transported at a constant speed.

Figure 8:
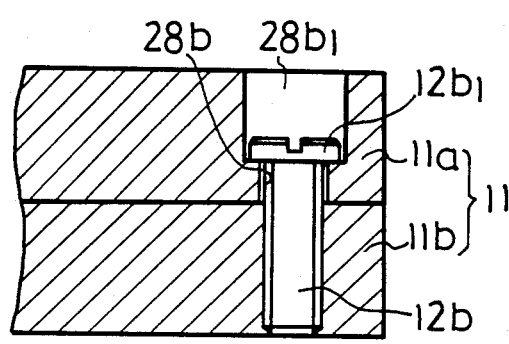
FIG. 8 is an enlarged cross-sectional view taken through the line B—B of FIG. 5 looking in the direction shown by the arrows.

Apertures 28a and 28b for the rear screws 12a and 12b which couple the upper half 11a and the lower half 11b of the cassette housing 11 together are formed so as to produce cavity portions 28a1 and 28b1 above the screw heads 12a1 and 12b1, or the upper half 11a side (refer to FIG. 8). These cavity portions 28a1 and 28b1 can be used as various kinds of detecting portions, for example, portions used for detecting the tracks A and B.

As shown in FIG. 3, on the top surface portions adjacent to the apertures 28a and 28b and on substantially the central surface portion near the rear edge surface portion of the cassette housing 11, there are respectively formed various kinds of detecting portions such as a tape thickness detecting hole 29, an auxiliary detecting hole 30 and a tape type select and/or cassette existence detecting hole 31 and an accidental erasure protection hole 32. Further, on each of the rear portions of both the side walls of the cassette housing 11, an eject grip 33 and a changer grip 34 are formed across the upper half 11a and the lower half 11b, respectively.

As set forth above, according to this embodiment, the guide groove 24 is formed on the front surface portion of the lid main section 17a of the front lid 17 at an asymmetrical position relative to the up and down direction of the lid 17 so as to be extended in its longitudinal direction. Thus, when the tape cassette is loaded onto each of the compartments 37 of the cassette magazine 35, since the engaging portion 36 is formed on one side wall of each compartment 37 of the cassette magazine 35 in association with the eccentric guide groove 24, a number of tape cassettes can be loaded into the compartments 37 of the cassette magazine 35 with the tracks A and B of all the tape cassettes aligned in the same direction.

Instead of the guide groove 24, a projected guide rail may be formed on the lid main section 17a of the front lid 17. The projected guide rail is shown in side elevation by a broken line 24' in FIG. 6. In this case, it is needless to say that a guide groove corresponding to the projected guide rail of the lid 17 is formed within each compartment 37 of the cassette magazine 35.

According to the present invention, as set forth above, the guide member is formed on the front surface portion of the lid main section of the front lid, which opens and/or closes the front opening portion of the cassette housing, at an asymmetrical position relative to the up and down direction of the front lid so as to be extended in its longitudinal direction. Thus, when a number of tape cassettes are inserted into and kept by the cassette magazine, the above-mentioned guide member functions as the guide portion for keeping the tape cassettes in the cassette magazine in such a manner that the tracks A and B of the respective tape cassette is used again, the tape cassette can be positively loaded from the desired side. In addition, since the guide member is formed on the lid, the mechanical strength of the cassette housing can be prevented from being decreased, and the spacings or the like for the various detecting sections and the indication labels can be prevented from being restricted. When the present invention is applied to a very small tape cassette, the present invention can achieve remarkable effects.

The above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A magnetic tape cassette comprising:
   (a) a cassette housing having a front opening portion;
   (b) a front lid formed of a lid main section and supporting arm portions attached perpendicularly to said lid main section at both its end portions, said front lid being pivotally mounted on the front portion of said cassette housing by said supporting arm portions so as to selectively open and close said front opening portion of said cassette housing;
   (c) tape guide rollers respectively provided in said cassette housing at both side end positions of the front opening portion of said cassette housing; and
   d) grooves respectively formed on both side end portions of said lid main section at positions opposite to said guide rollers in a direction perpendicular to the longitudinal direction.

2. A magnetic tape cassette as defined in claim 1, wherein said cassette housing includes an upper half and a lower half fastened together by screws, one of said upper half and said lower half being provided with apertures in which the screws are recessed so that cavity portions are visible above the recessed screws, said cavity portion identifying which track of the tape in the cassette housing is in use.

3. A magnetic tape cassette according to claim 1, wherein said cassette housing includes indicator means for indicating various conditions of the tape inside the cassette housing.

4. A magnetic tape cassette according to claim 3, wherein said indicator means includes at least one hole provided near a read edge of the cassette housing.

5. A magnetic tape cassette according to claim 4, wherein said at least one hole includes a hole specially arranged on said cassette housing for indicating tape thickness.

6. A magnetic tape cassette according to claim 4, wherein said at least one hole includes a hole for protecting against accidental erasure of the tape.

7. A magnetic tape cassette comprising:
(a) a cassette housing having a front opening portion;
(b) a front lid formed of a lid main section and supporting arm portions attached perpendicularly to said lid main section at both its end portions, said front lid being pivotably mounted on the front portion of said cassette housing by said supporting arm portions so as to selectively open and close said front opening portion of said cassette housing;
(c) guide means formed on the front surface portion of said lid main section at an asymmetrical position relative to the up and down direction of said front lid so as to be extended in a longitudinal direction; and further comprising tape guide rollers respectively provided in said cassette housing at both side end portions of the front opening portion of said cassette housing, and grooves respectively formed on both side end portions of said lid main section at positions opposite to said guide rollers in a direction perpendicular to the longitudinal direction.

8. A magnetic tape cassette comprising:
(a) a cassette housing having a front opening portion;
(b) a front lid formed of a lid main section and supporting arm portions attached perpendicularly to said lid main section at both its end portions, said first lid being pivotably mounted on the front portion of said cassette housing by said supporting arm portions so as to selectively open and close said front opening portion of said cassette housing; and
(c) a groove formed on the front surface portion of said lid main section at an asymmetrical position relative to the up and down direction of said front lid so as to be extended in a longitudinal direction.

9. A magnetic tape cassette comprising:
(a) a cassette housing having a front opening portion;
(b) a front lid formed of a lid main section and supporting arm portions attached perpendicularly to said lid main section at both its end portions, said front lid being pivotably mounted on the front portion of said cassette housing by said supporting arm portions so as to selectively open and close said front opening portion of said cassette housing; and
(c) a projected guide rail formed on the front surface portion of said lid main section at an asymmetrical position relative to the up and down direction of said front lid so as to be extended in a longitudinal direction.

* * * * *

UNITED STATES PATENT AND TRADEMARK OFFICE
CERTIFICATE OF CORRECTION

PATENT NO. : 4,858,848
DATED : August 22, 1989
INVENTOR(S) : Takashi Katoku, et. al.

It is certified that error appears in the above-identified patent and that said Letters Patent is hereby corrected as shown below:

On the title page:

In the References Cited, change Patent No. "3,519,521" to --4,519,521

Col. 4, line 49, change "cf" to --of--

Col. 5, line 15, after "housing" insert --11,--

In Claims:

Col. 10, line 4, "first" to --front--

Signed and Sealed this

Third Day of July, 1990

Attest:

HARRY F. MANBECK, JR.

Attesting Officer

Commissioner of Patents and Trademarks